(12) United States Patent
Romi

(10) Patent No.: US 6,524,091 B2
(45) Date of Patent: Feb. 25, 2003

(54) PRESSURE CONTROL MECHANISM FOR A MOLDING APPARATUS

(75) Inventor: Romeu Romi, Santa Bárbara d' Oeste (BR)

(73) Assignee: Industrias Romi, S.A., Santa Barbara d'Oeste (BR)

( * ) Notice: Subject to any disclaimer, the term of this patent is extended or adjusted under 35 U.S.C. 154(b) by 0 days.

(21) Appl. No.: 09/751,149

(22) Filed: Dec. 28, 2000

(65) Prior Publication Data

US 2002/0086088 A1 Jul. 4, 2002

(51) Int. Cl.$^7$ .............................................. B29C 45/64
(52) U.S. Cl. ........................ 425/190; 425/590; 425/595
(58) Field of Search .............................. 425/190, 451.2, 425/451.9, 590, 595

(56) References Cited

U.S. PATENT DOCUMENTS

| 3,528,134 | A | * | 9/1970 | Fischbach .................... 425/595 |
| 3,540,081 | A | * | 11/1970 | Carrieri et al. ............. 425/595 |
| 3,801,256 | A | * | 4/1974 | Farrell ........................ 425/595 |
| 4,453,902 | A | * | 6/1984 | Imbert ........................ 425/47 |
| 4,504,208 | A | * | 3/1985 | Kurumaji et al. ........... 425/595 |
| 4,874,309 | A | | 10/1989 | Kushibe et al. |
| 5,194,267 | A | * | 3/1993 | Funakoshi et al. .......... 425/595 |
| 5,238,394 | A | * | 8/1993 | Hirata ......................... 425/595 |
| 5,275,550 | A | | 1/1994 | Romi |
| 5,417,913 | A | * | 5/1995 | Arent .......................... 425/595 |
| 5,618,487 | A | * | 4/1997 | Hettinga ...................... 425/595 |
| 5,620,723 | A | | 4/1997 | Glaesener et al. |
| 5,624,965 | A | | 4/1997 | Glaesener et al. |
| 5,645,875 | A | | 7/1997 | Glaesener et al. |
| 5,744,177 | A | * | 4/1998 | Lin ............................. 425/595 |
| 6,231,329 | B1 | * | 5/2001 | Van Keuren, III .......... 425/595 |

FOREIGN PATENT DOCUMENTS

| BR | 9300002 | 1/1993 |
| DE | 4230824 | 9/1991 |
| EP | 0747197 | 12/1996 |
| GB | 2064415 | 6/1981 |

* cited by examiner

Primary Examiner—James P. Mackey
(74) Attorney, Agent, or Firm—Steinberg & Raskin, P.C.

(57) ABSTRACT

An injection molding machine having four tie bars extending through and between a movable platen and a fixed platen each of which carry a half of a mold. To enable the movable platen to withstand the forces which arise during a molding process, a pressure control mechanism including a piston in association with each tie bar is received within a corresponding recess provided in the movable platen and in order to grip the tie bars during the molding process a gripping mechanism is provided which is supported by the piston such that the gripping mechanism and the piston effectively form a single movable unit. The gripping mechanism comprises a pair of gripping jaws which are transversely movable and are moved by way of a rotatable disc which is also provided in the single movable unit.

27 Claims, 7 Drawing Sheets

PRESSURE CONTROL MECHANISM FOR A MOLDING APPARATUS

FIELD OF THE INVENTION

The present application relates to a molding apparatus, and to a pressure control mechanism for the molding apparatus. Specifically, the present application relates to injection molding machines which use tie bars to prevent twisting of the platens and to a pressure control mechanism for applying pressure to the platens.

BACKGROUND OF THE INVENTION

It is well known to provide injection molding machines with tie bars, and means are generally provided to grip those tie bars to allow for the platens to withstand the high pressures applied to mold halves. Examples of machines with clamping or gripping mechanisms for the tie bars include U.S. Pat. Nos. 5,275,550, 5,620,723, 5,624,695, 5,645,875, and 4,874,302. Injection molding machines with similar features are also described in Brazilian Patent No. 9300002-2, German Patent No. 4230824, and European Patent No. 0747197.

Alternative arrangements of gripping mechanisms for injection molding machine tie bars are described in GB-A-2064415, DE-A-3034024, and East German Patent No. 133635.

OBJECT AND SUMMARY OF THE INVENTION

It is an object of the present invention to provide a new pressure control mechanism for applying pressure to a platen of a molding machine.

According to a first aspect of the present invention a pressure control mechanism for applying pressure to a platen of a molding machine is provided the pressure control mechanism comprising a piston having a longitudinally extending bore therethrough for receiving a tie rod of the molding machine, the piston also having a front pressure applying surface, and a second, rear surface spaced longitudinally from said front surface, the pressure control mechanism further comprising a gripping mechanism supported by the piston, wherein said gripping mechanism comprises a substantially cylindrical body having a longitudinally extending bore therethrough, and a front support surface which is affixed to the rear surface of the piston such that the bores in the piston and said substantially cylindrical body are aligned, wherein said gripping mechanism further comprises a pair of gripping jaws mounted in said substantially cylindrical body to be movable relative to one another transversely of the longitudinal extent of the bore in the substantially cylindrical body; and moving means arranged to cause a relative movement of said gripping jaws towards one another to thereby grip a tie bar extending through said aligned bores, wherein said moving means comprises a rotatable disc, and movement translation means arranged to translate rotation of said disc into transverse movement of said gripping jaws.

Although a pressure control mechanism according to the present invention may be used in any molding machine where the piston is employed to actively pressurize the platen, the present invention has been specifically designed for use in injection molding machines where the piston must withstand the high pressures applied to the platen during the molding process.

In an embodiment of a pressure control mechanism according to the present invention the piston and the gripping mechanism are fixed together to form a single unit.

In a preferred embodiment of the present invention, the gripping jaws are mounted in recesses in said cylindrical body such that said recesses permit transverse sliding movement of the gripping jaws with respect to a longitudinal bore formed in said cylindrical body. The movement translation means comprise slots in one of the gripping jaws and said disc, and corresponding projections carried by the other of said disc and said gripping jaws, such that upon rotation of the disc each projection is moved along its corresponding slot to cause transverse sliding movement of said jaws. Preferably, each of said slots has an elongated, cranked shape. In a preferred embodiment of the present invention, the projections are carried by the disc, and each gripping jaw has a slot in which a corresponding projection is slidably received. Preferably, the projections are pins or rollers which extend generally in the longitudinal direction.

The construction according to the present molding apparatus is relatively simple and robust and avoids complex linkages between the piston and the gripping mechanism as are apparent in prior art constructions.

In another embodiment of the present invention, each gripping jaw has a concave gripping surface which extends over a segment of a circle having a similar radius to that of the longitudinal bore extending in said substantially cylindrical body. Preferably, a series of gripping formations are provided on the concave gripping surface of each said gripping jaw. These gripping formations may comprise a plurality of teeth or screw threads. For example, a series of gripping formations are provided on the concave gripping surface of each of said gripping jaws. In an embodiment, in each gripping mechanism, the rotatable disc of the moving means is supported for rotation within a retaining ring, the retaining ring being fixed to a rear support surface of said substantially cylindrical body, said rear support surface being longitudinally spaced from the front support surface thereof.

In yet another embodiment of the present invention, said moving means incorporates a rotatable disc which is structured and arranged to be rotated within a retaining ring. The retaining ring is coupled to a rear support surface of said substantially cylindrical body and the rear support surface is longitudinally spaced from the front support surface thereof.

Preferably, said moving means further comprises link means interconnecting the retaining ring and the rotatable disc. The link means are extensible and retractable in order to effect rotation of said rotatable disc.

The present invention also relates to a molding apparatus having a first and a second relatively movable platen, each of said movable platens carrying a respective mold half; tie rods extending between and through each of the first and second platens for guiding their relative movement; and controllable displacement means for causing relative movement between the first and second platens to open and close the mold halves.

The molding apparatus further comprises a pressure control mechanism for applying a pressure to each of the movable platens and to maintain them closed. The pressure control mechanism comprises a respective piston and cylinder unit associated with each tie rod, the piston of each of said units having a longitudinal bore through which an associated tie rod extends, and wherein the piston of each said units supports a gripping mechanism arranged to selectively grip the associated tie rod, wherein each of said gripping mechanisms is mounted for reciprocating movement together with its supporting piston. Each of said gripping mechanisms comprises a pair of gripping jaws arranged to be transversely movable with respect to the associated tie rod to selectively grip the tie rod; moving means arranged to cause relative movement of said gripping jaws towards one another in order to grip the associated tie rod. Each of said moving means comprises a rotatable disc; and movement translation means arranged to translate rotation of said disc into transverse movement of said gripping jaws.

While the piston in a molding apparatus according to the present invention may be used to actively pressurize the movable platens towards their closed position, it is generally preferred that the piston be used to withstand the high pressures applied to the platens during a molding process, and in particular to an injection molding process.

In an embodiment of the molding apparatus according to the present invention, the gripping mechanism and supporting piston are structured and arranged to be movable as a single unit. Preferably, in each gripping mechanism, said gripping jaws are mounted in recesses in said cylindrical body for transverse sliding movement with respect to the associated tie rod, and wherein said movement translation means comprise slots in one of the gripping jaws and said disc; and corresponding projections carried by the other of said disc and said gripping jaws, such that upon rotation of the rotatable disc each projection is moved along its corresponding slot (i.e., an elongated cranked shape) to cause a transverse sliding movement of said jaws. In a preferred embodiment, in each gripping mechanism, the projections are carried by the rotatable disc, and each gripping jaw has a slot in which a corresponding projection is slidably received. Preferably, said projections are pins or rollers which extend generally in the longitudinal direction.

In yet another preferred embodiment, the molding apparatus further comprises a single common drive means structured and arranged to drive the moving means of all of said gripping mechanisms; and link means linking all, of the gripping mechanisms to said single common drive means.

It is a particular advantage of the present invention to have a single common drive means as this reduces, for example, the number of hydraulic actuators required thereby reducing the manufacturing cost of the molding machines. For example, the single common drive means may be a hydraulic piston and cylinder unit.

Preferably, the link means interconnect the moving means of each gripping mechanism to the moving means of one or more of the other gripping mechanisms, and said single common drive means is connected to directly drive the moving means of one of the gripping mechanisms. As such all of the moving means are simultaneously driven by said single common drive means and the link means interconnecting the moving means of each gripping mechanism and one or more of the other gripping mechanisms.

In another embodiment of the molding apparatus according to the present invention, the piston of each of said piston and cylinder units has a first front surface for applying a pressure, and a second rear surface, spaced longitudinally from said front surface. The associated gripping mechanism comprises a substantially cylindrical body having a front support surface which is affixed to the rear surface of the piston, and a longitudinally extending bore therethrough which is aligned with the bore of the piston such that the associated tie rod extends through both the piston and the substantially cylindrical body. The pair of gripping jaws of said gripping mechanism are then mounted in said substantially cylindrical body in order to be movable relative to one another and transversely movable with respect to the associated tie rod.

Preferably, the moving means further comprises link means interconnecting said retaining ring and said rotatable disc. The link means is extensible and retractable in order to effect rotation of said disc and wherein the link means of each gripping mechanism is connected to the link means of one or more of the other gripping mechanisms.

In another preferred embodiment of the present invention, the molding apparatus further comprises adjustment means structured and arranged to adjust a longitudinal position of each tie rod relative to the first and second movable platens.

BRIEF DESCRIPTION OF THE DRAWINGS

Embodiments of the present invention will hereinafter be described, by way of example, with reference to the accompanying drawings, in which.

DETAILED DESCRIPTION OF THE INVENTION

The present invention is described herein with particular reference to an injection molding machine. However, the invention is equally applicable to other types of molding apparatus.

Figure 1:
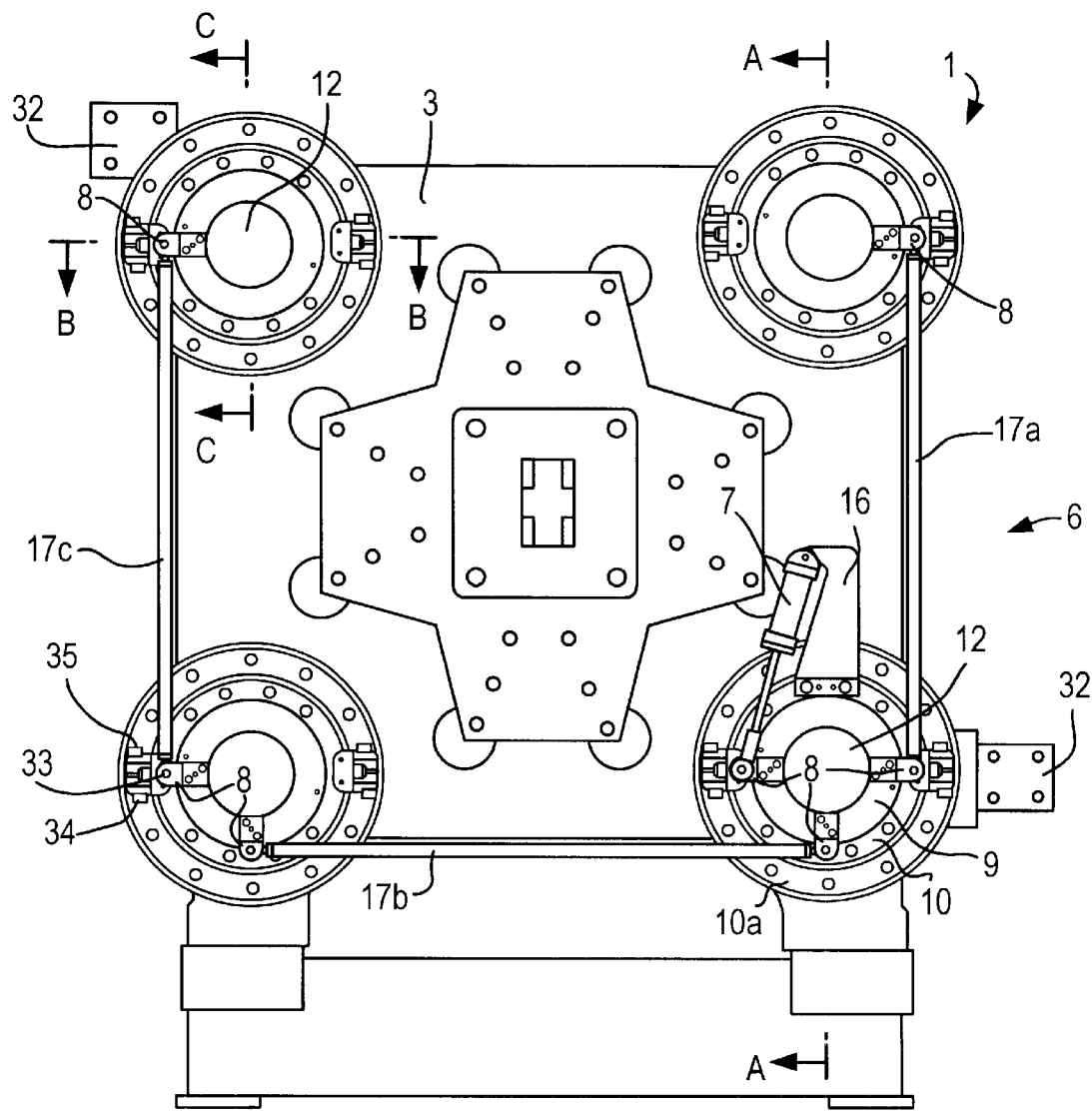
FIG. 1 is a first end view of a platen assembly of an injection molding machine showing four pressure control mechanisms for a platen.
Figure 2:
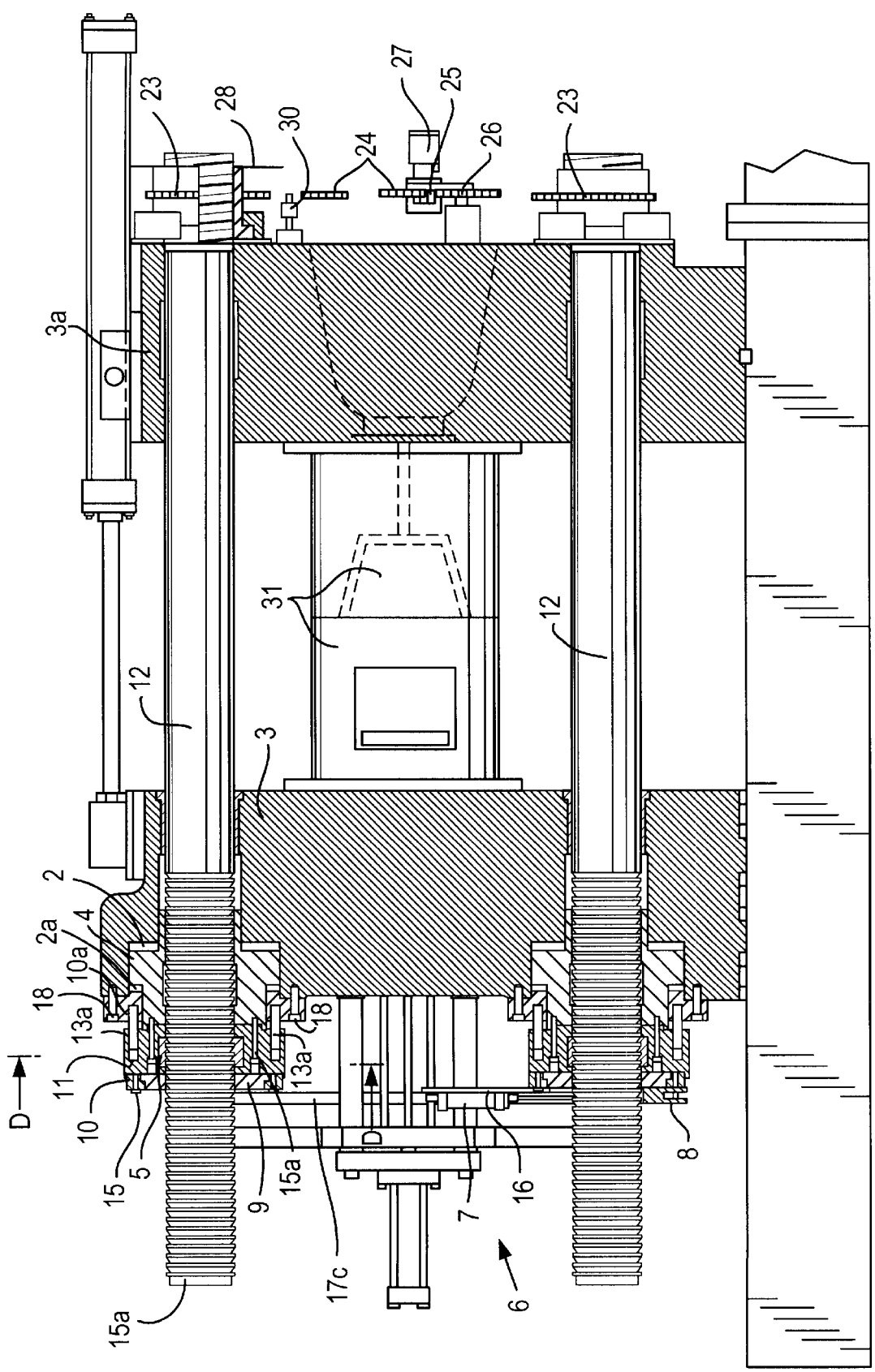
FIG. 2 is a sectional view taken along the line A—A of FIG. 1 showing two pressure control mechanisms each associated with a tie bar extending through a platen.

The injection molding machine shown in FIGS. 1 and 2 has a fixed platen 3a structured and arranged to carry a first mold half 31 and a movable platen 3 structured and arranged to carry a second mold half 31. Four tie bars 12 extend through the movable and fixed platens 3a, 3 to thereby guide the movement of the movable platen 3. It will be appreciated that the tie bars 12 extend through appropriate bores at the four corners of each platen 3, 3a and are longitudinally displaceable relative thereto. Adjustment means, shown generally by 6a, are provided adjacent the stationary platen 3a to displace the tie bars longitudinally.

Figure 7:
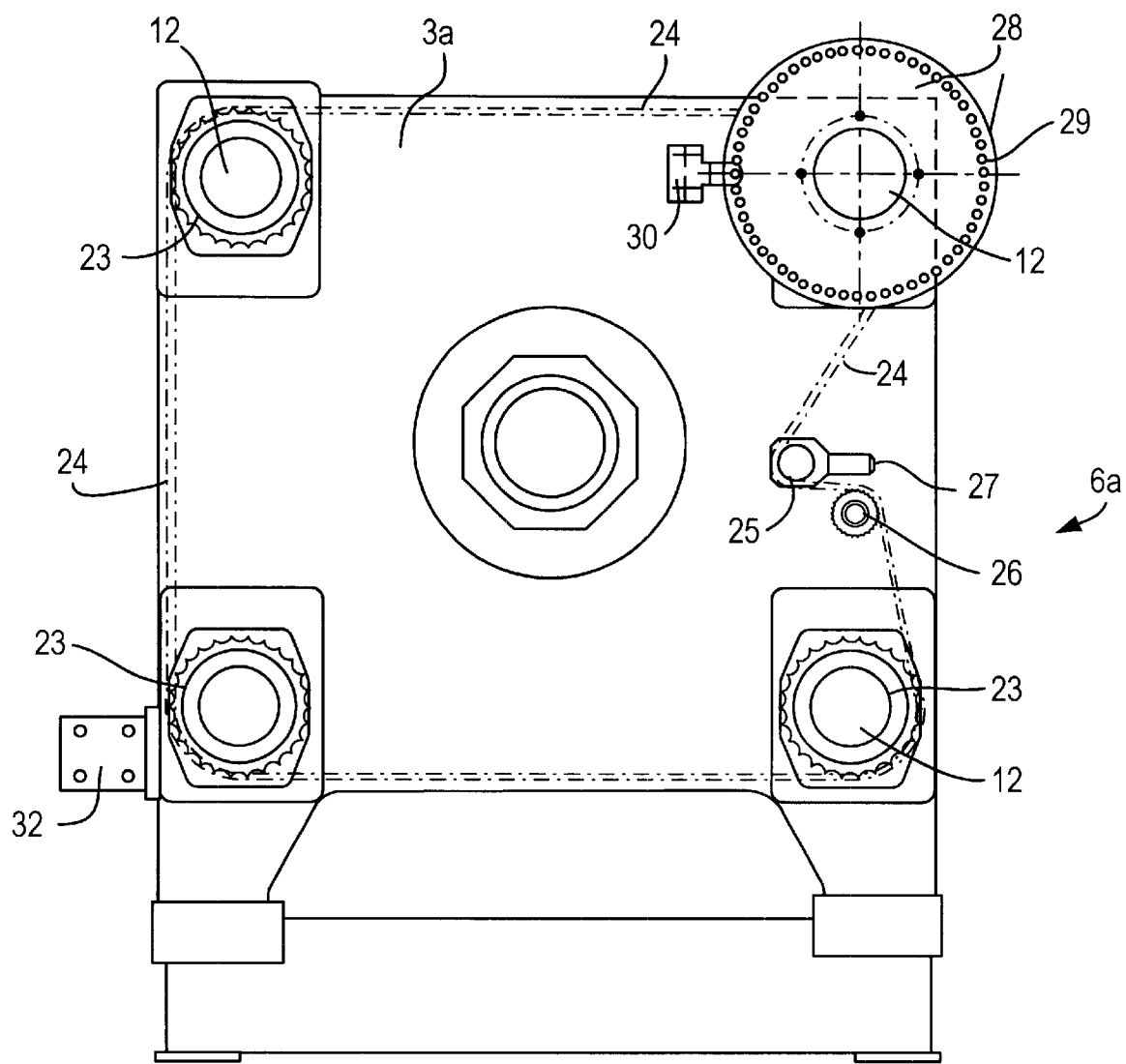
FIG. 7 is an end view of the platen assembly opposite to that of FIG. 1 showing a mechanism for adjusting the longitudinal position of the tie bars.

As is shown in FIGS. 2 and 7, the adjustment means 6a comprises a sprocket wheel 23 threaded onto the end of each tie bar 12, thereby preventing longitudinal linear movement along each tie bar 12, and supported by the stationary platen 3a. Each sprocket wheel 23 is structured and arranged to abut an external face of the platen 3a and to be rotatable with respect to the external face of the platen. The sprocket wheels 23 prevented from inadvertently sliding in the longitudinal direction by their threaded engagement with each tie bar 12. However, rotating the sprocket wheels 12 longitudinally displaces the corresponding tie bar. As shown in FIG. 7, the sprocket wheels 23 are each driven by an endless chain 24 which is driven by a pinion gear 25 mounted on a motor 27. This motor may, for example, be an electric or a hydraulic motor. A pinion 26 engages the pinion gear 25 and is used to adjust the tension of the chain 24. It will therefore be appreciated that rotation in one or other direction of the motor 27 will cause the endless chain 24 to rotate all of the sprocket wheels 23 simultaneously, and in the same direction, whereby the four tie bars 12 will be longitudinally displaced relative to the platens 3a and 3.

As shown in FIGS. 1 and 2, four pressure control mechanisms 1 are associated with the moveable platen 3. Each pressure control mechanism 1 comprises a piston 4, through which the respective tie bar 12 extends; and a gripping mechanism comprising a pair of gripping jaws 5, a cylindrical body 11 and a rotatable disc 9 structured and arranged to grip the tie bar 12 when pressure is to be applied to the movable platen 3.

The piston 4 is provided with a longitudinal bore therethrough through which the tie rod 12 extends. The piston 4 is mounted in a hydraulic chamber formed in the rear surface of the movable platen 3. The chamber is divided by the piston 4 into a front chamber 2 and a rear chamber 2a. A front surface of the piston 4 is adapted to engage the movable platen 3 and acts as a pressure applying surface, whereas an opposed rear surface of the piston, which is longitudinally spaced from the front surface thereof, is coupled to a cylindrical body 11 which forms part of the gripping mechanism. The bore extending longitudinally through the cylindrical body 11 is aligned with the bore in the piston such that the cylindrical body 11 and the piston 4 effectively form a single body through which the respective tie rod 12 extends.

Figure 5A:
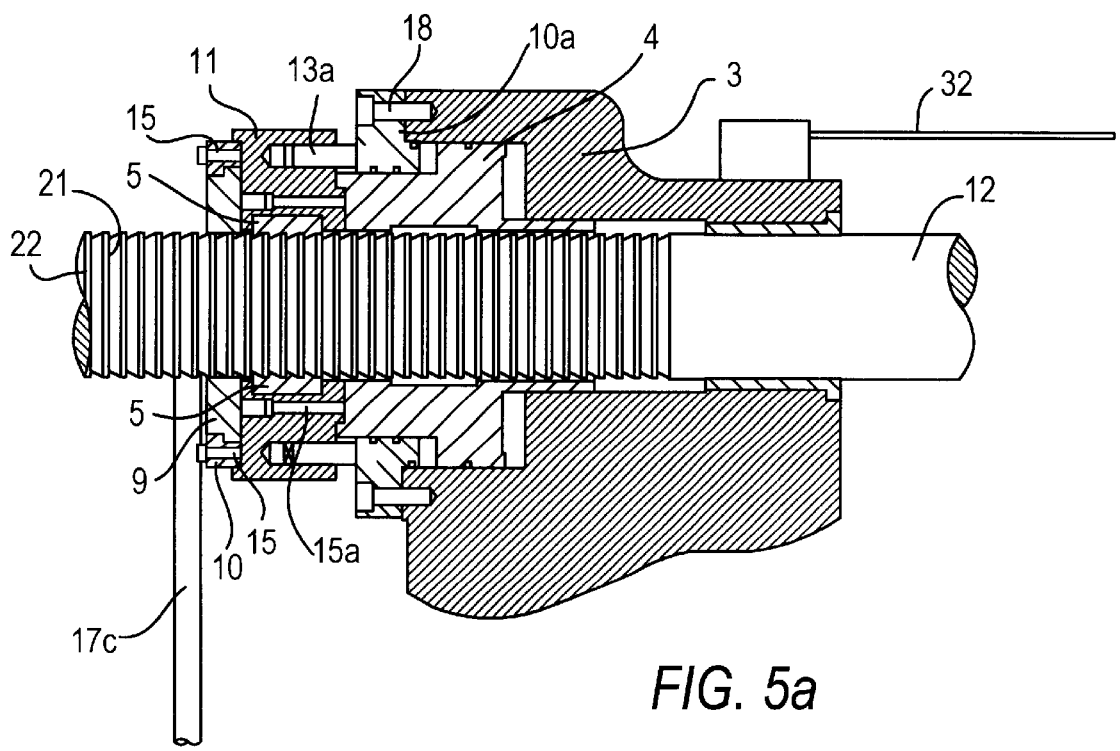
FIG. 5a is a sectional view of the pressure control mechanism taken along the line C—C of FIG. 1.
Figure 5:
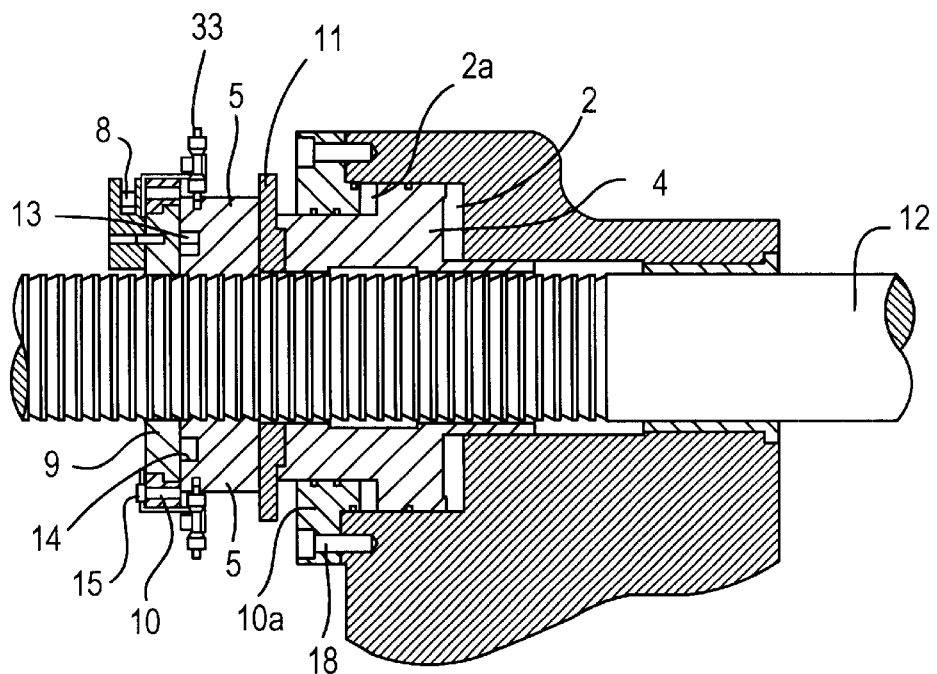
FIG. 5 is a further sectional view of the pressure control mechanism taken along line B—B of FIG. 1.

As can be seen in FIGS. 2 and 5a, the pair of gripping jaws 5 are structured and arranged within the cylindrical body 11 in order to be transversely movable with respect to one another and transversely movable with respect of the longitudinal extent of the bore in the cylindrical body 11. This transverse movement of the gripping jaws 5 enables them to be moved into and out of gripping engagement with the respective tie rod 12.

Figure 4:
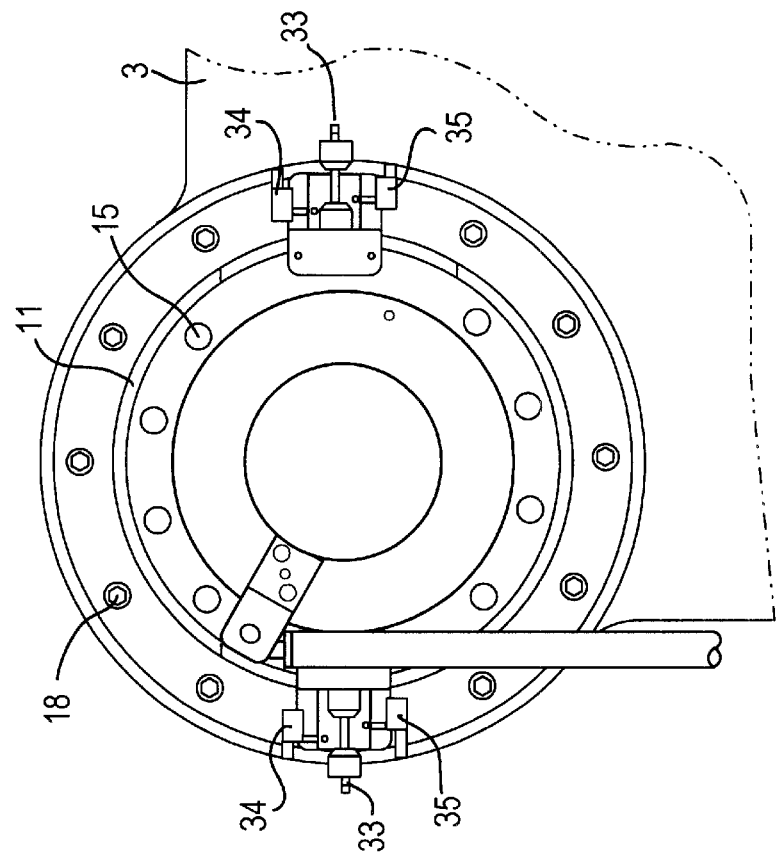
FIG. 4 is a view similar to that of FIG. 3 showing the gripping mechanism disengaged.
Figure 3:
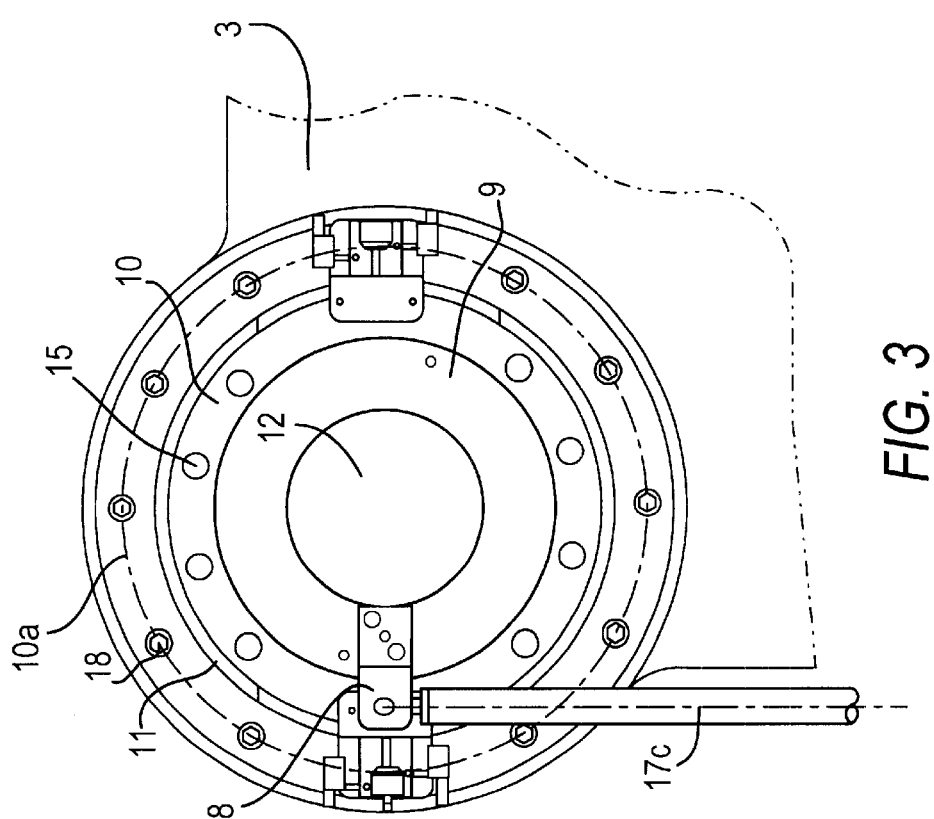
FIG. 3 is a front view of one of the pressure control mechanisms showing its gripping mechanism in the engaged position.
Figure 4A:
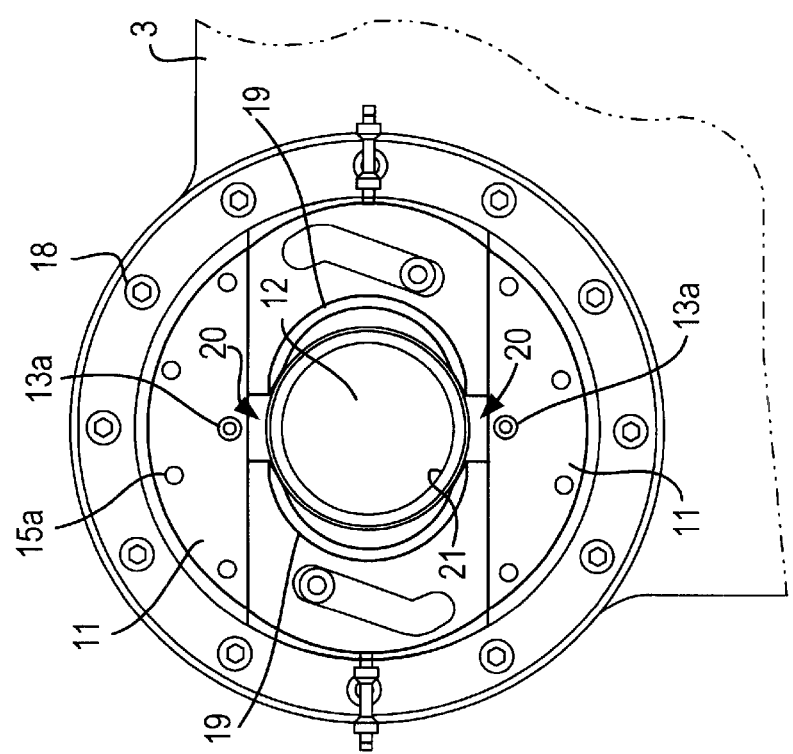
FIG. 4a is a view similar to FIG. 3a, however, showing the gripping jaws disengaged.
Figure 3A:
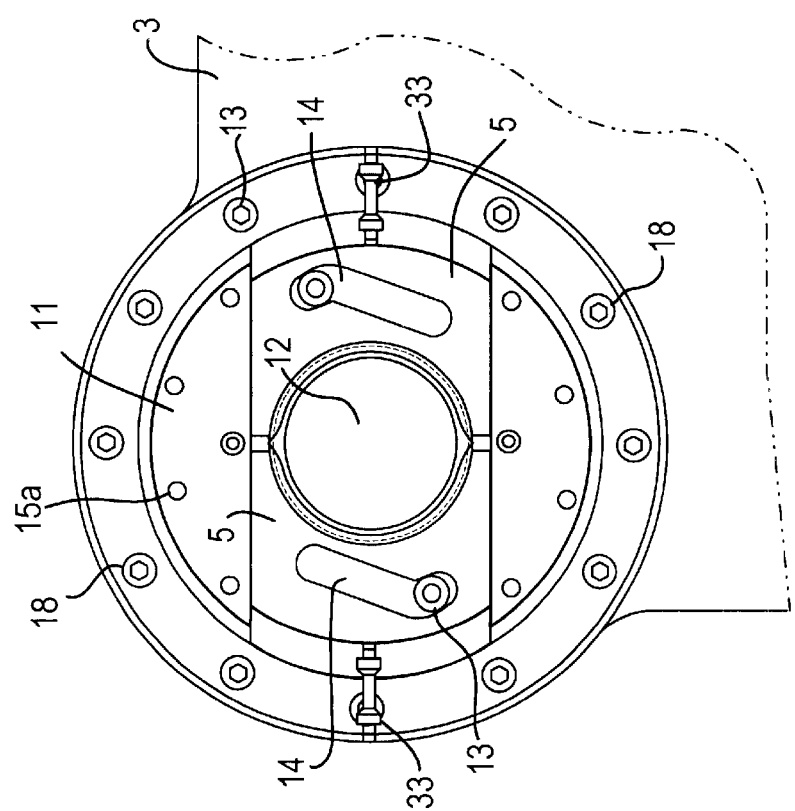
FIG. 3a is a section of the gripping mechanism taken along the line D—D of FIG. 2.

As can be seen in FIGS. 3a and 4a, the cylindrical body 11 comprises a recessed face 20 to accommodate the gripping jaws 5. A rotatable disc 9 is operatively coupled to the cylindrical body 11 in order to effectuate the transverse movement of the jaws 5. Movement translation means in the form of pins and rollers 13 engaging in corresponding slots 14, are arranged to translate rotation of the disc 9 into the transverse movement of the gripping jaws 5. In the arrangement illustrated, the rotatable disc 9 carries a pair of pins 13 which each engage in a respective slot 14 in a respective jaw 5.

The rotatable disc 9 is structured and arranged to freely rotate within a retaining ring 10. The retaining ring 10 is fixed to a rear support surface of the substantially cylindrical body 11 by screws 15 and defines an annular collar for retaining the rotatable disc 9 therein. Adjacent faces of the rotatable disc 9 and the cylindrical body 11 abut one another. In addition, the cylindrical body 11 is fixed to the piston 4 by screws 15a. It will be seen, for example in FIG. 5a, that the piston 4 has a large diameter portion to the rear of which is a portion of smaller diameter. The large diameter portion of the piston 4 is guided within the chamber 2, 2a formed in the movable platen 3, whilst the smaller diameter portion of the piston 4 is guided within a ring 10a which is fastened to the rear face of the movable platen 3 by means of screws 18. In addition, pins 13a fasten the ring 10a to the cylindrical body 11 to prevent rotation of the body 11 and the corresponding piston 4 when the rotatable disc 9 is rotated. The pins 13a extend within respective blind passages within the cylindrical body 11 whereby sliding movement of the cylindrical body 11 relative to the pins 13a, and hence relative to the piston 4, is possible.

As described above, each pressure control mechanism 1 includes moving means structured and arranged to cause relative transverse movement of the gripping jaws 5. Each moving means includes the rotatable disc 9 and link means for effecting rotation of the rotatable disc. As is seen in FIG. 1, the link means comprises a hydraulic actuator 7 which is extensible and retractable to effect rotation of the rotatable disc 9 and interconnects a bracket 16 coupled to the retaining ring 10 and an arm 8 coupled to the rotatable disc 9. Whereby, extension or retraction of the actuator 7 will cause the disc 9 to rotate whereby the pins or rollers 13 carried thereon move along their respective slots 14 in the gripping jaws 5 to impart transverse movement to the jaws 5. In this respect each of the slots 14 acts as a cam with the respective pin or roller.

The pressure control mechanism 1 comprising the piston 4, its gripping mechanism 5, 9, 10, and the moving means 7, 8, 16 taken together form a complete pressure applying and gripping assembly which is movable as a single unit.

As is shown in FIG. 1, the pressure control mechanism 1, to which the hydraulic actuator 7 is attached, has two further bracket arms 8, one of which is connected to an end of an upstanding connecting rod 17a and the other of which is fastened to an end of a horizontally extending connecting rod 17b. Each of the connecting rods 17a and 17b has its other end connected by way of a respective bracket arm 8 to a further pressure control mechanism 1. Similarly, a third connecting rod 17c interconnects the bracket arms 8 of the mechanism 1 connected to the rod 17b and a fourth pressure control mechanism 1. It will be immediately understood that actuation of the hydraulic actuator 7, to either extend or retract, will rotate the rotatable disc 9 of the associated pressure control mechanism 1 and will thereby cause simultaneous rotation of each of the rotatable discs 9 of each of the other mechanisms 1.

The commonly powered movement means 6 shown in FIG. 1 for rotating the discs 9 of all of the mechanisms 1 has physical link rods 17 to cause the simultaneous rotation of the discs 9, the links being powered by a single common drive means, namely the actuator 7. Of course, other means such as gears, sprockets and chains may be used to interconnect the mechanisms 1 and any appropriate means to drive the rotation, for example, such as electric or hydraulic motors, may be used.

Figure 6:
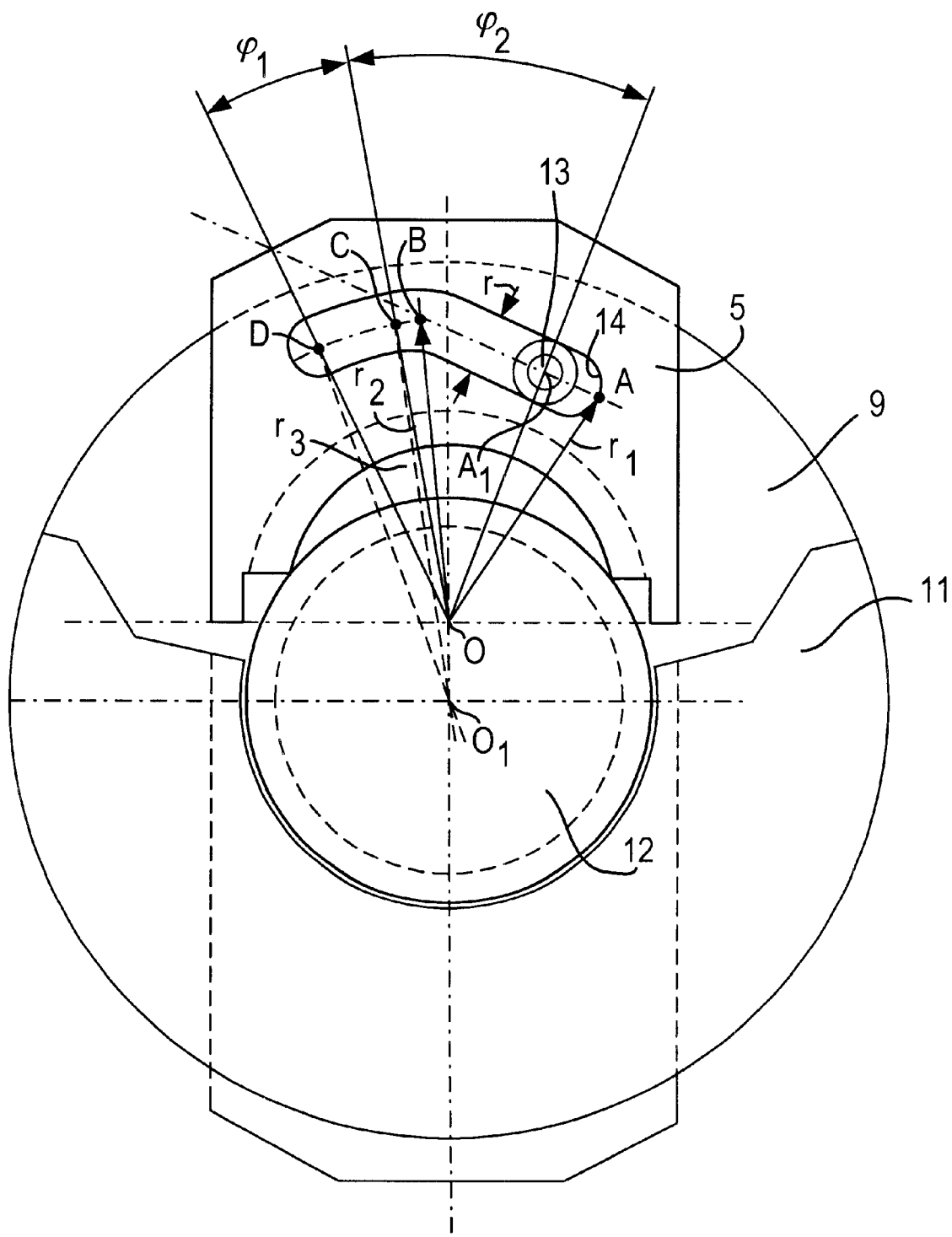
FIG. 6 shows a gripping jaw of the gripping mechanism and illustrates movement translation means associated therewith.

FIG. 6 shows the amplitude of the rotational movement of the rotatable disc 9 in one or other direction according to a predetermined angle ϕ. This movement causes the pair of gripping jaws 5 to approach or retract from the respective tie bar 12 in a transverse direction thereby gripping or ungripping the tie bar 12. Each gripping jaw 5 has a concave gripping surface which extends over a segment of a circle having a similar radius to that of the longitudinal bore extending in the cylindrical body 11.

The curved inner gripping surface of each gripping jaw 5 is provided with teeth 19 (as seen in FIG. 4a) which are structured and arranged to engage in generally circular grooves 21 (as seen in FIG. 4a) formed around the outer cylindrical surface of an end portion of the tie bar 12. As illustrated in FIG. 5a, the grooves 21 define between them teeth 22 of the tie bar 12. When the pair of jaws 5 are in their gripping position, the teeth 19 of the jaws 5 cooperate with the teeth 22 of the tie bar. This is the closed gripping position as shown in FIGS. 3 and 3a. With the tie bar so gripped, the piston 4 can be subjected to hydraulic pressure to pressurise the movable platen 3 or to prevent it from moving during the injection molding process.

When the rotatable disc 9 is rotated in one direction or other, the distance over which the jaws 5 travel is determined by the angle of inclination of the slot 14 in the jaw 5 and by the travel of the roller 13 along the slot 14.

As shown in FIG. 6, the slot 14 is defined to have a width which is equal to the radius r of the roller 13. The slot 14 has a first rectilinear part defined between a point A with radius r1 and a point B with radius r2 with its centre in point O. The travel of the gripping jaws 5 is determined by the roller 13 travelling from a point $A_1$ along the slot to a point C, $A_1$ being the starting point for the travel of the roller 13 when the actuator 7 is initially actuated. A transition zone is provided in the slot 14 between the point B and the point C in which transition zone instantaneous deceleration of the travel of the jaws occurs as the jaws are brought together into their closed gripping position.

The slot 14 has an extended portion which extends over an arc from point C to a point D. The arc CD has a radius r3 with a centre in $O_1$ which is the centre of the tie bar 12. As the roller 13 travels along the arc CD, no further movement is imparted to the jaws. Positioning the roller 13 at any point along the arc CD guarantees that the closed position of the jaws 5 cannot be reversed, for example, as a result of machine vibration. Thus, movement of the gripping jaws can only be caused by rotation of the rotatable disc 9 by way of the actuator 7. It will be clear that rotation of the disc 9 through an angle $\phi$ will correspond to the active closing travel of the jaws 5. The travel of the roller 13 along the arc CD is caused by rotation of the disc 9 through the angle $\phi_1$. The irreversibility of the movement of the roller 13 along the arc CD provides a built-in safety feature of the gripping mechanism.

Before actuating the moving means 6 to cause closure of the gripping jaws 5, the circular grooves 21 on the tie bars 12 must be positioned relative to the teeth 19 of the gripping jaws in order to enable free penetration of the teeth 19 within the circular grooves 21. This prevents collision between the teeth 19 on the jaws and the teeth 22 on the tie bars. To facilitate this penetration, the teeth of the clamping jaws have a smaller thickness than the width of the circular grooves 21. This difference corresponds to the clearance required for the piston 4 when the gripping action takes place.

When the tie bars 12 are to be gripped, the correct alignment between the teeth 19 and 22 is achieved by longitudinal displacement of the tie bars 12 by way of the adjustment means 23, 24, 25 and 27 described above. To provide the correct alignment, a disc 28 is mounted on one of the sprocket wheels 23. As seen in FIG. 7, this disc 28 has a number of pins or holes 29 provided around its periphery, each of which is arranged to actuate an appropriate sensor 30 (i.e., an inductive proximity switch or a photocell device). The sensor 30 is connected to electronic control means (not shown) of the molding machine and is used to control the longitudinal displacement of the tie bars 12 during set-up for a molding process.

By way of illustration, if the disc 28 is provided with N pins or holes 29, the smallest longitudinal displacement which can be discriminated or controlled by N pins is 11 N times the pitch of the tie bar thread pitch. For example, if there are 180 pins or holes 29, and the tie bar thread pitch is 3 mm, the smallest displacement of the tie bar which can be discriminated will be $\frac{1}{180} \times 3$ mm, which is 0.0167 mm. This provides a very high degree of control over the adjustment process.

The two mold halves 31 are carried by the respective platens 3 and 3a and, in setting up the machine for an injection molding process, will generally have their height adjusted. The displacement of the movable platen to close or open the two mold halves 31 is by way of two piston and cylinder units 32 whose displacement is controlled by the electronic control means of the machine.

In operation, the hydraulic unit 32 moves the movable platen 3 to bring the mold halves 31 to their closed position (kiss point) as illustrated in FIG. 2. Thereafter, the teeth 19 of the gripping jaws 5 are correctly aligned with the teeth 22 on the tie bars 12 as described above. In this respect, the electronic control means for the machine is able to recognize the position of the four pressure control mechanisms 1 and particularly the position of the teeth of the jaws 5 relative to the grooves 21 of the tie bars. Then, the gripping mechanisms are actuated to thereby grip the tie bars. Hydraulic pressure is then applied to the chambers 2 in order to pressurize the pistons 4. This causes the pistons and the gripping mechanisms to be moved slightly to the left as shown in FIG. 2. The total travel of the piston 4 is at least the total of the pitch of the tie bar teeth, plus the clearance between the teeth 19 and the grooves 21, plus the maximum elongation of the tie bar due to material elastic deformation. At this point the platens are in condition to withstand the considerable pressures which occur when material is injected into the mold halves.

Once the molding operation has been completed, the hydraulic pressure within the chamber 2 is released. At the same time a pin 33 (FIG. 4) coupled to each gripping jaw 5 is arranged to actuate a micro-switch 35 in order to cause the movement means 6 to rotate the discs 9 and thereby open the gripping jaws 5. Once the gripping jaws 5 are opened, the pin 33 closes a micro-switch 34 thereby actuating the two piston and cylinder units 32 in order to withdraw the movable platen 3 and open the mold halves 31.

The control means of the machine will automatically restart the cycle. Closing of the movable platen 3 causes closure of the micro-switch 34 which will enable the rotatable discs 9 to be rotated by way of the actuator 7 to close the gripping jaws 5. On closure, the micro-switch 35 will have been closed and will actuate the application of hydraulic pressure to the piston 4 to enable the platen 3 to withstand the pressure applied to the mold halves.

It will be appreciated that variations in and modifications to the embodiments as described and illustrated may be made within the scope of the attached claims.

I claim:

1. A pressure control mechanism for applying pressure to a platen of a molding machine, the pressure control mechanism comprising:

at least one piston having a longitudinally extending bore therethrough for receiving a tie rod of the molding machine therein, a first front pressure applying surface, and a second rear surface spaced longitudinally from said front surface;

a gripping mechanism supported on each of said pistons, wherein said gripping mechanism comprises a substantially cylindrical body having a longitudinally extending bore therethrough, a front support surface coupled to the rear surface of said piston such that the bore in said piston and the bore in said substantially cylindrical body are aligned with one another and a pair of gripping jaws operatively coupled in said substantially cylindrical body to be slidably movable with respect to one another and transversely movable with respect to the longitudinal extent of the bore in the substantially cylindrical body;

moving means structured and arranged to cause relative movement of said gripping jaws towards one another to thereby grip said tie rod extending through said aligned bores, wherein said moving means comprises a rotatable disc operatively coupled to said gripping jaws; and movement translation means structured and arranged to translate a rotation of said disc into a transverse movement of said gripping jaws wherein said movement translation means comprise slots in one of said gripping jaws and said rotatable disc and corresponding projections carried by the other of said rotatable disc and said gripping jaws, such that upon rotation of said rotatable disc each projection is moved along its corresponding slot to thereby cause transverse sliding movement of said gripping jaws, each of said slots having a first portion and a second portion contiguous with said first portion, wherein said second portion is arranged at an angle relative to said first portion.

2. The pressure control mechanism according to claim 1, wherein said gripping jaws are mounted in recesses in said substantially cylindrical body for transverse sliding movement with respect to the longitudinal extent of the bore therein.

3. The pressure control mechanism according to claim 2, wherein each of said slots has an elongated cranked shape.

4. The pressure control mechanism according to claim 2, wherein said projections are coupled to said rotatable disc, and each gripping jaw is provided with said slot in which a corresponding projection of said rotatable disc is slidably received.

5. The pressure control mechanism according to claim 2, wherein said projections are one of pins and rollers extending in a substantially longitudinal direction.

6. The pressure control mechanism according to claim 1, wherein said gripping jaws comprise:

a concave gripping surface having a radius which substantially corresponds to a radius of said longitudinal bore extending in said substantially cylindrical body.

7. The pressure control mechanism according to claim 6, wherein said gripping jaws further comprise:

a plurality of gripping formations along said concave gripping surface.

8. The pressure control mechanism according to claim 7, wherein said gripping formations comprise:

one of a plurality of teeth and screw threads.

9. The pressure control mechanism according to claim 1, wherein said rotatable disc is rotatably supported within a retaining ring, the retaining ring being coupled to a rear support surface of said substantially cylindrical body, said rear support surface being longitudinally spaced from said front support surface thereof.

10. The pressure control mechanism according to claim 9, wherein said moving means further comprises:

link means interconnecting said retaining ring and said rotatable disc, wherein said link means are extensible and retractable to effect a rotation of said rotatable disc.

11. A molding apparatus comprising:

a first and a second relatively movable platen each carrying a respective half of a mold;

a plurality of tie rods extending between and through the first and second platens for guiding a relative movement of said platens;

controllable displacement means operatively coupled to said platens for causing said relative movement of said first and second platens to thereby open and close said mold halves;

a pressure control mechanism operatively coupled to said platens for applying a pressure to said platens to thereby maintain said platens in a closed position, the pressure control mechanism comprising a respective piston and cylinder-unit associated with each of said tie rods, the piston of each of said units having a longitudinal bore formed therein through which the associated tie rod extends, the piston of each of said units having a gripping mechanism operatively coupled thereto and structured and arranged to selectively grip the associated tie rod, wherein each of said gripping mechanisms is structured and arranged for reciprocating movement within with its associated piston, and wherein each of said gripping mechanisms includes a pair of gripping jaws transversely movable with respect to the associated tie rod and to selectively grip the tie rod;

moving means structured and arranged to cause relative movement of said gripping jaws towards one another to thereby grip said tie rod, wherein said moving means comprises a rotatable disc operatively coupled to said gripping jaws; and movement translation means structured and arranged to translate a rotation of said disc into a transverse movement of said gripping jaws wherein said movement translation means comprise slots in one of said gripping jaws and said rotatable disc and corresponding projections carried by the other of said rotatable disc and said gripping jaws, such that upon rotation of said rotatable disc each projection is moved along its corresponding slot to thereby cause transverse sliding movement of said gripping jaws, each of said slots having a first portion and a second portion contiguous with said first portion wherein said second portion is arranged at an angle relative to said first portion.

12. The molding apparatus according to claim 11, wherein, in each of said gripping mechanisms, said gripping jaws are mounted in recesses therein for transverse sliding movement with respect to the associated tie rod.

13. The molding apparatus according to claim 12, wherein each of said slots has an elongated cranked shape.

14. The molding apparatus according to claim 12, wherein said projections are coupled to said rotatable disc, and each gripping jaw is provided with said slot in which a corresponding projection of said rotatable disc is slidably received.

15. The molding apparatus according to claim 12, wherein said projections are one of pins and rollers which extend generally in the longitudinal direction.

16. The molding apparatus according to claim 11, further comprising:

a single common drive means structured and arranged to drive the moving means of each of said gripping mechanisms simultaneously; and link means for interconnecting said gripping mechanism and said single common drive means.

17. The molding apparatus according to claim 16, wherein said link means interconnects the moving means of each gripping mechanism and the moving means of at least one of the other gripping mechanisms, and wherein said single common drive means is connected to directly drive the moving means of one of the gripping mechanisms such that all of the moving means are simultaneously driven by said common drive means via said link means.

18. The molding apparatus according to claim 17, wherein said single common drive means is an hydraulic piston and cylinder unit.

19. The molding apparatus according to claim 11, wherein the piston of each of said piston and cylinder units has a front pressure applying surface, and a second rear surface spaced longitudinally from said front surface, and the associated gripping mechanism comprises a substantially cylindrical body having a front support surface coupled to the rear surface of the piston, and a longitudinal bore extending through said piston and said substantially cylindrical body such that the associated tie rod extends therethrough, and wherein the pair of gripping jaws of said gripping mechanism are mounted in said substantially cylindrical body to be transversely movable with respect to one another and transversely movable with respect to the associated tie rod.

20. The molding apparatus according to claim 19, wherein each gripping jaw comprises:
 a concave gripping surface having a radius which substantially corresponds to a radius of said longitudinal bore extending in said substantially cylindrical body.

21. The molding apparatus according to claim 20, wherein said gripping jaws further comprise:
 a plurality of gripping formations along said concave gripping surface.

22. The molding apparatus according to claim 21, wherein said gripping formations comprise:
 one of a plurality of teeth and screw threads.

23. The molding apparatus according to claim 19, wherein said rotatable disc is rotatably supported within a retaining ring, the retaining ring being coupled to a rear support surface of said substantially cylindrical body, said rear support surface being longitudinally spaced from the front support surface thereof.

24. The molding apparatus according to claim 23, wherein said moving means further comprises:
 link means interconnecting said retaining ring and said rotatable disc, and wherein said link means is extensible and retractable to effect rotation of said disc, wherein the link means of each gripping mechanism is connected to the link means of one or more of the other gripping mechanisms.

25. The molding apparatus according to claim 11, further comprising:
 adjustment means structured and arranged to adjust the longitudinal position of each tie rod relative to the first and second movable platens.

26. The molding apparatus according to claim 1, wherein said first portion of each of said slots is linear and said second portion of each of said slots is arcuate in shape.

27. The molding apparatus according to claim 11, wherein said first portion of each of said slots is linear and said second portion of each of said slots is arcuate in shape.

* * * * *